United States Patent [19]

Brugerolle et al.

[11] Patent Number: 4,847,057

[45] Date of Patent: Jul. 11, 1989

[54] PROCESS AND INSTALLATION FOR AMMONIA TREATMENT OF A GAS

[75] Inventors: Jean-Renaud Brugerolle, Paris; Michel Combe, Meudon, both of France; Joseph Paganessi, Burr Ridge, Ill.

[73] Assignees: Liquid Air Corporation, Walnut Creek, Calif.; L'Air Liquide, Societe Anonyme pour l'Etude et l'Exploitation des Procedes Georges Claude, Paris, France

[21] Appl. No.: 62,607

[22] PCT Filed: Oct. 16, 1986

[86] PCT No.: PCT/FR86/00356

§ 371 Date: Jun. 2, 1987

§ 102(e) Date: Jun. 2, 1987

[87] PCT Pub. No.: WO87/02696

PCT Pub. Date: May 7, 1987

[30] Foreign Application Priority Data

Oct. 25, 1985 [FR] France ............... 85 15864

[51] Int. Cl.$^4$ .............. B01D 53/14; B01D 53/34
[52] U.S. Cl. ......................... 423/234; 55/70; 55/89; 55/228
[58] Field of Search .............. 423/234, 235; 55/70, 55/89, 94, 228

[56] References Cited

U.S. PATENT DOCUMENTS

| 2,162,838 | 6/1939 | Cole et al. | 423/234 |
| 2,884,304 | 4/1959 | Grosskinsky et al. | 423/234 |
| 3,541,761 | 11/1970 | Pike | 55/94 |
| 3,789,105 | 1/1974 | Tippmer et al. | 423/234 |
| 3,819,816 | 6/1974 | Wunderlich et al. | 423/234 |
| 3,960,519 | 6/1976 | Ebeling et al. | 55/89 |
| 4,080,424 | 3/1978 | Miller et al. | 423/234 |
| 4,342,731 | 8/1982 | Ritter | 423/234 |
| 4,589,889 | 5/1986 | Spencer | 55/89 |

FOREIGN PATENT DOCUMENTS 1069083 10/1962 United Kingdom ............... 423/234

Primary Examiner—John Doll
Assistant Examiner—Jeffrey Edwin Russel
Attorney, Agent, or Firm—Young & Thompson

[57] ABSTRACT

This process comprises eliminating the ammonia from a gaseous effluent of the treatment of scrubbing with a liquid essentially comprising water, regenerating the scrubbing liquid by stripping countercurrent with respect to the gas to be treated, then recycling at least most of the regenerated scrubbing liquid by putting it into thermal exchange relation with the scrubbing liquid to be regenerated.

Application in the production of $CO_2$ by the treatment of smoke with ammonia.

8 Claims, 2 Drawing Sheets

PROCESS AND INSTALLATION FOR AMMONIA TREATMENT OF A GAS The present invention relates to the technique of treating gases with ammonia. It more particularly applies to the recovery of $CO_2$ from smoke which is relatively poor in $CO_2$, such as combustion smoke which contains about 8 to 20% or cement works smoke or lime furnace smoke which contains 20 to 50% of $CO_2$. It may also apply to other types of treatments of gases available at high temperature, for example the purifying of acid gases, in particular smoke containing $SO_x$, $NO_x$ or HCl impurities before they are discharged to the atmosphere or are subsequently treated with PSA (Pressure Swing Adsorption).

In industrial countries, the production of $CO_2$ has developed most often from industrial or natural sources "rich" in $CO_2$ (97%) and containing very small amounts of impurities, which results in a relatively cheap $CO_2$.

The reduction in the number of chemical sources in these countries, in particular the number of ammonia factories, makes it necessary to envisage the production of $CO_2$ from sources "poor" in $CO_2$, such as the aforementioned smokes.

In this field of the recovery of $CO_2$, as in the other aforementioned applications, ammonia is an absorption agent of interest owing to its properties and moderate cost, but it presents a difficult problem as concerns the rejection of gas from the installation. Indeed, the rejected gas contains a relatively large content of ammonia and it must be recovered for reasons of economy and avoidance of pollution of the environment.

An object of the invention is to provide a process and an installation for solving this problem in a particularly economical manner.

The invention therefore provides a process for treating with ammonia a gas available at high temperature, characterised in that it comprises eliminating the ammonia from a gaseous effluent of the treatment by scrubbing with a liquid formed essentially by water, and regenerating the scrubbing liquid by stripping countercurrent with respect to the gas to be treated, then recycling at least the essential part of the regenerated scrubbing liquid by putting it into thermal exchange relation with the scrubbing liquid to be regenerated.

Thus it is the gas to be treated itself by the energy it contains which ensures the regeneration of the scrubbing water and, simultaneously, cools and facilitates its own treatment with the ammonia.

If the treatment with ammonia presents at least one kinetically slow reaction, as is the case in the absorption of the $CO_2$, in accordance with a first manner of carrying out the invention, downstream of said distillation, the gas to be treated is made to circulate in an absorption apparatus fed with an ammonia solution, then the ammonia is eliminated from the gaseous effluent of this apparatus by said scrubbing.

In this case, advantageously, the liquid effluent leaving the absorption apparatus is desorbed by reduction of pressure.

On the other hand, if the considered reaction is sufficiently rapid, as is the case in the purification of acid smoke, according to another manner of carrying out the invention, downstream of said distillation, the gas is subjected directly to said scrubbing, so that said treatment with ammonia is constituted by said regeneration of the scrubbing liquid. The smoke may then be subjected, if necessary, to a treatment which presents at least one kinetically slow reaction, such as a decarbonation.

The invention also provides an installation for carrying out the aforementioned process. This installation comprises a scrubbing tower fed at its base with the gaseous effluent of the ammonia treatment apparatus and at its top with a liquid essentially constituted by water, a distillation apparatus whose top is connected through a first conduit to the base of the scrubbing tower and which is fed at its base with the gas to be treated, and a recycling conduit, in thermal exchange relation with said first conduit, which connects the base of the distillation apparatus to the top of the scrubbing tower.

BRIEF DESCRIPTION OF THE DRAWINGS

Two manners of carrying out the invention will now be described with reference to the accompanying drawings, in which.

Figure 1:
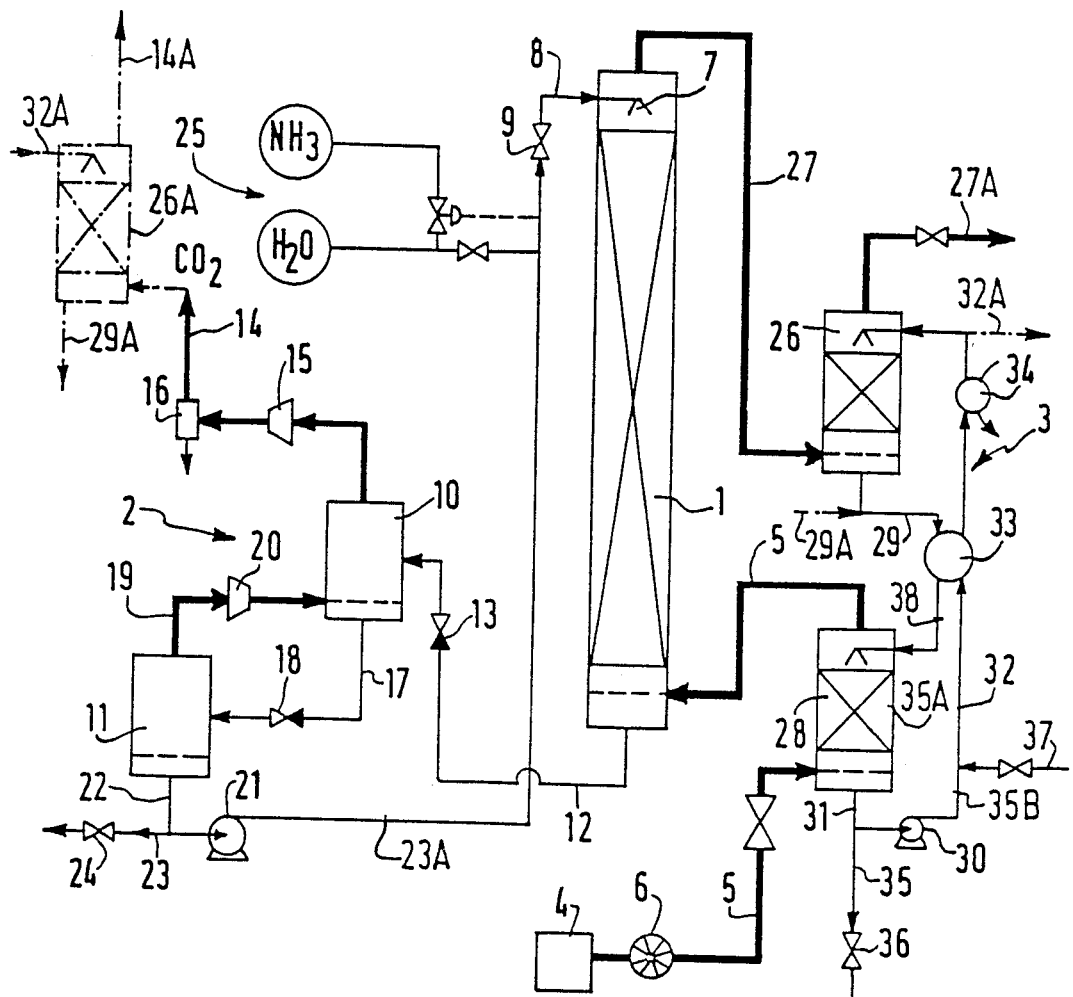
FIG. 1 shows diagrammatically a $CO_2$ recovering installation according to the invention.

The installation illustrated in FIG. 1 essentially comprises an absorption column 1, a desorption device 2 operating under a vacuum and a water scrubbing unit 3. In the drawing, thin lines indicate the liquid currents and thick lines the gas currents.

The absorption column 1 is fed at its base with the smoke coming from a source 4 through a conduit 5 provided with a blower or fan 6. In the column 1, this smoke rises countercurrent with respect to an ammonia solution which absorbs $CO_2$, at a temperature in the neighbourhood of the ambient temperature (for example, on the order of 10° to 30° C.) and at a pressure in the neighbourhood of atmospheric pressure.

The ammonia solution is supplied to a distributing device 7 disposed at the top of the column 1 through a conduit 8 provided with a flow regulating valve 9. The desorption or regeneration device 2 operating under a vacuum mainly comprises two expansion vessels 10, 11. The first vessel 10 is connected to the bottom of the column 1 through a conduit 12 provided with an expansion valve 13. Leading from the top of this vessel is a product conduit 14 provided with a vacuum pump 15 and, downstream of the latter, with a phase separator 16. The bottom of the vessel 10 is connected to the vessel 11 through another conduit 17 provided with an expansion valve 18, and the top of the vessel 11 is connected to the vessel 10 through a conduit 19 provided with a vacuum pump 20.

Consequently, there may be maintained in the vessel 10 a first level of depression, for example an absolute pressure of 200 mm Hg which constitutes the inlet pressure of the pump 15 which delivers gas to the separator 16 at roughly atmospheric pressure and there may be maintained in the vessel 11 a lower second level of depression, for example an absolute pressure of 100 mm Hg, the pump 20 drawing gas in at this pressure and delivering it at 200 mm Hg.

A recycling pump 21 comprises an inlet orifice connected to the bottom of the vessel 11 through a conduit 22 and a delivery orifice connected to the conduit 8. A withdrawing branch conduit 23 provided with a valve 24 is connected to the conduit 22 and a device 25 for supplying complementary ammonia solution at the desired content is connected to the conduit 8.

The scrubbing unit 3 comprises a scrubbing column 26 inserted in a discharge conduit 27 for the gaseous effluent produced at the top of the column 1, and a column 28 for regenerating the scrubbing water inserted in the conduit 5 supplying the smoke to be treated.

The bottom of the column 26 is connected to the top of the column 28 through a conduit 29 and the bottom of the column 28 is connected to the inlet of a recycling pump 30 through a conduit 31, the outlet of this pump being connected to the top of the column 26 through a conduit 32. The conduits 29 and 32 are put into thermal exchange relation by a heat exchanger 33, and the conduit 32 is provided, on the downstream side of the latter, with a complementary cooler 34 employing water or air. A withdrawing branch conduit 35 provided with a valve 36 is connected to the conduit 31 and a complementary water supply conduit 37 is connected to the conduit 32.

The installation just described operates in the following manner.

After passing through the column 1, the ammonia solution enriched with $CO_2$ is withdrawn from the bottom of this column through the conduit 12, expanded in the valve 13 and enters the vessel 10. This expansion produces a flash and the remaining liquid passes into the vessel 11 through the conduit 17 while undergoing a second expansion, and therefore with production of a new flash, in the valve 18.

The liquid remaining in the vessel 11 is recycled by the pump 21 to the column 1 through the conduits 22 and 8. The flash gas produced in the vessel 11 is returned by the pump 20, through the pipe 19, to the vessel 10 where a part of the water and ammonia it contains is condensed. The remaining gas and the flash gas produced in the vessel 10 are together discharged by the pump 15 through the conduit 14; the compression produced by this pump enables the water and the ammonia to be separated in the liquid form in the separator 16 and it is gas containing more than 99 percent $CO_2$, constituting the product of the installation, which leaves this separator for subsequent treatment in the conventional manner. It will be observed that the heat of compression of the pump 20 is recovered in the vessel 10 for improving the desorption and that the vessel 10 acts as cooler for the pump. Further, it will be understood that the greater the number of flashes the smaller the amount of energy required for the recompression, since there is still further approached a reversible procedure, at the expense of course of additional investment costs.

A small part of the liquid flowing through the conduit 22 may be eliminated if necessary through the conduit 23 so as to avoid the concentration in the solution of products of reaction of the ammonia with the $SO_x$, $NO_x$ impurities when the latter are present in the initial smoke. In this case, an identical complementary flow of the liquid is provided by the device 25.

After decarbonation in the column 1, the smoke contains for example 0.5 to 3% ammonia owing to the partial pressure of the ammonia above the solution. This effluent must therefore be purified and, for this purpose, the gas from the top of the column 1 is sent through the conduit 27 to the scrubbing column 26 where practically all the ammonia is absorbed by the water fed to the top of the column through the conduit 32, with a flow on the order of 5 to 10% of that of the ammonia solution fed to the column 1. The decarbonated gas which leaves the column 26 and is discharged to the atmosphere at 27A therefore conforms to the accepted standards for ammonia content. The scrubbing water slightly charged with ammonia leaves the column 26 through the conduit 29 and, after having been heated in the exchanger 33, travels downwardly through the column 28 where it is regenerated by stripping owing to the heating provided by the smoke flowing in the conduit 5 and upwardly in the column 28, this smoke being initially at a high temperature, usually higher than 150° C. Consequently, the column 28 serves both to cool the smoke of the source 4, which favours absorption in the column 1, and to strip the scrubbing water of the gaseous effluent of the installation, which recovers the ammonia absorbed by the water and at the same time avoids pollution of the environment.

The regenerated water received at the bottom of the column 28 is recycled by the pump 30 through the conduits 31 and 32, pre-cooled in the exchanger 33 and cooled to the neighbourhood of the ambient temperature in the exchanger 34. A small part of the flow of water may again be eliminated, if necessary, through the conduit 35, so as to avoid concentration of $SO_x$, $NO_x$ impurities, the additional water being supplied through the conduit 37.

As a numerical example, starting with a smoke at 180° C. containing 25% $CO_2$, 7% water, 4% oxygen and 64% inert substances, and with the use of a column 1 having three theoretical levels fed with a solution of 4 moles of ammonia per liter, an extraction yield of $CO_2$ on the order of 50 to 90% may be attained, the specific energy consumed being wholly in the electrical form (blower 6, circulating pumps 21 and 30, vacuum pumps 15 and 20) and being much lower than that of conventional processes for recovering $CO_2$ from similar sources. The flow of scrubbing water is on the order of 5 to 10% of the flow of the ammonia solution. Note in this respect that the low flow of scrubbing water required with respect to the flow of the ammonia solution (and therefore with respect to the flow of the gas to be treated) is advantageous in several respects: on the one hand, the pump 30 is of low power; on the other hand, the heat provided by the smoke is sufficient to effectively regenerate the scrubbing water and consequently to obtain a very low discharge of ammonia to the atmosphere through the conduit 27A.

It may also be noted that, in the frequent cases where the smoke contains $SO_x$, $NO_x$ impurities, these impurities react with the ammonia and produce at 23 and 36 advantageous by-products. Indeed, the reaction with $SO_x$ and $NO_x$ forms by-products of use as fertilizers.

As indicated in FIG. 1, several modifications may be envisaged:

The purge 23 may be connected at 23A to the conduit 8, i.e. on the high pressure side of the pump 21.

Likewise, the purge 35 may be connected at 35A in the tower 28 or at 35B on the downstream side of the pump 30.

If necessary, the residual ammonia in the $CO_2$ produced may be eliminated in the same way as that in the gaseous effluent from the column 1 so as to avoid the formation of insoluble carbonates upon subsequent compression of the $CO_2$ for its liquefaction. For this purpose, as indicated in dot-dash lines in FIG. 1, the product conduit 14 is made to communicate with the base of a second scrubbing tower 26A which is fed at the top through a conduit 32A connected to the conduit 32 on the downstream side of the heat exchanger 34.

The purified $CO_2$ leaves the top of the tower 26A through the conduit 14A, and the liquid of the bottom of this tower returns, through a conduit 29A, to the conduit 29 on the upstream side of the heat exchanger 33.

An additional supply of ammonia solution may be introduced at 38 into the conduit 29 to ensure that acid impurities, such as $SO_x$ and $NO_x$, do not enter the tower 1.

Figure 2:
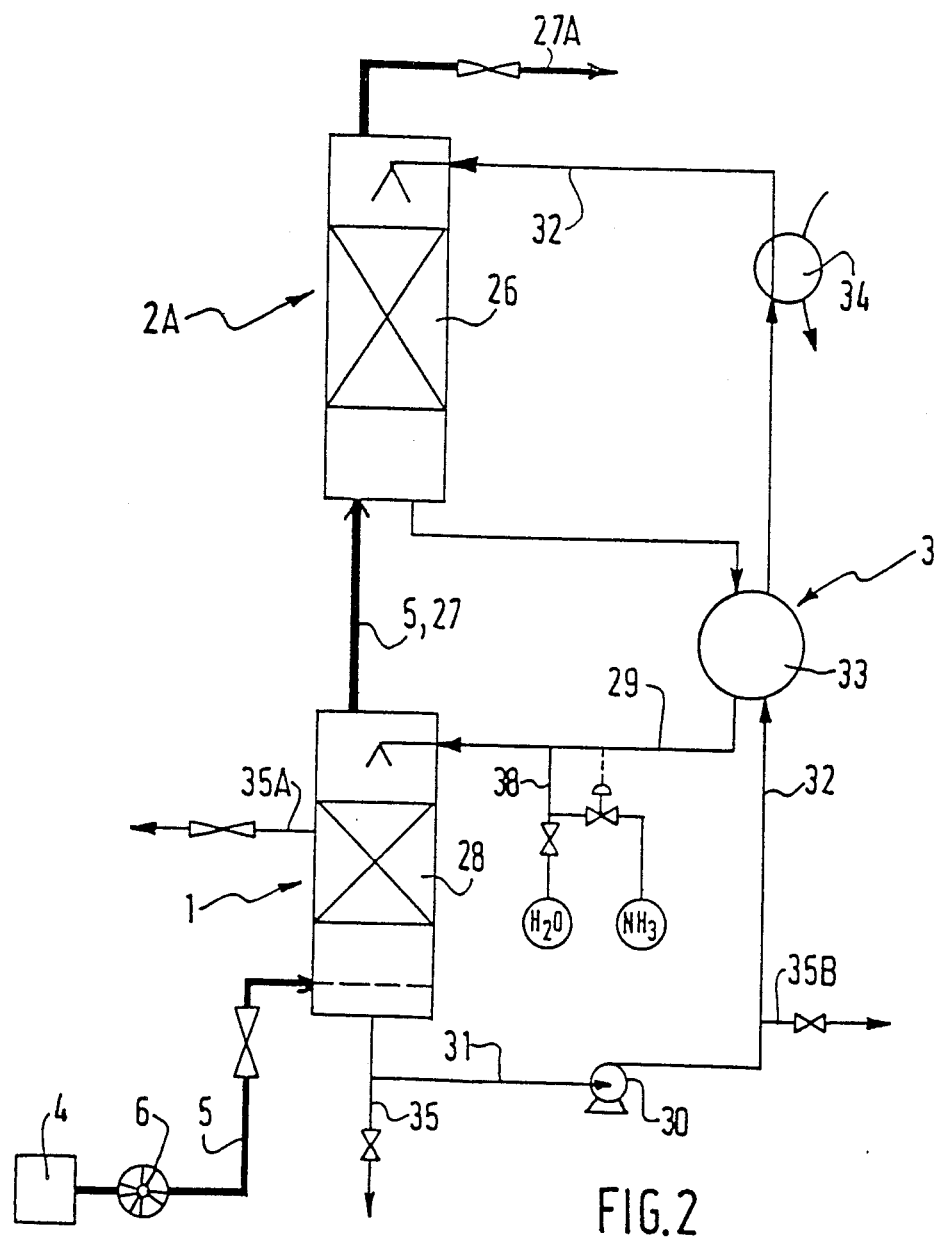
FIG. 2 is a similar view of a smoke purifying installation according to the invention.

FIG. 2 shows a diagram of a similar installation corresponding to the case where the treatment with ammonia only comprises kinetically rapid reactions. This treatment occurs in the column 28 itself, which therefore corresponds to the apparatus 1 while the desorption occurs in a desorption device 2A comprising the tower 26, which therefore corresponds to the desorption device 2. For this purpose, the conduit 5 directly connects the top of the column 28 to the base of the tower 26 and therefore corresponds to the conduit 27 which conveys the gaseous effluent of the treatment with ammonia.

Further, additional ammonia solution is supplied at 38 to the conduit 29 on the downstream side of the heat exchanger 33 for controlling the treatment in the column 28. For this purpose, there is added, for a constant additional water flow, a flow of ammonia regulated by an analyser of the content of ammonia in the water flowing in the conduit 29. The withdrawal at 35A occurs, in the illustrated embodiment, in the upper part of the column 28.

The installation shown in FIG. 2 operates in the following manner.

The smoke to be treated, coming at a high temperature from the source 4, is slightly compressed by the fan 6 and sent to the base of the column 28 through the conduit 5. The smoke regenerates, owing to the heat it contains, the water charged with ammonia which is fed to the top of the column 28 through the conduit 29 leading from the scrubbing tower 26. The regenerated solution leaves the base of the column 28 through the conduit 31 and is recycled by the pump 30 to the tower 26 through the conduit 32 and the heat exchangers 33 and 34. The temperature prevailing in the column 28 is slightly higher than the ambient temperature, for example on the order of 30° to 50° C.

Meanwhile, the impurities of the smoke ($SO_x$ and $NO_x$) react with the ammonia solution diluted in the upper part of the column 28. A small part of the liquid flow is withdrawn from the column 28 through the conduit 35, 35A or 35B so as to eliminate the absorbed impurities of the smoke.

The smoke leaves the column 28, purified of $NO_x$ and $SO_x$ but charged with ammonia vapour, and is fed to the base of the tower 26. The smoke then contains for example 0.5 to 3% ammonia, which will be absorbed in the tower 26 by the cold regenerated solution formed by almost pure water which is fed to the top of this tower and is put into contact with the smoke in a countercurrent manner at a temperature in the neighbourhood of ambient temperature (for example, 10° to 40° C.).

The smoke purified of ammonia leaves the top of the tower 26 through the conduit 27A for discharge to the atmosphere or its subsequent treatment. The smoke may, for example, be subsequently decarbonated by a P.S.A. system in which the presence of $SO_x$, $NO_x$ and $NH_3$ in the smoke would have seriously reduced the performances.

The scrubbing solution charged with ammonia leaves the tower 26 through the conduit 29 and, after having been heated in the exchanger 33, is fed to the top of the column 28 through which it travels downwardly countercurrent with respect to the smoke to be treated.

As a numerical example, starting with a smoke at 180° C. formed by 25% $CO_2$, 7% water, 4% oxygen and 64% inert substances, containing 150 ppm (by volume) of $SO_x$ and 1,500 ppm (by volume) of $NO_x$, and by means of an ammonia solution of 0.2 to 0.5 mole per liter in the column 28, there may be obtained, after treatment of the gas by the installation shown in FIG. 2, a smoke containing less than 100 ppm of $NH_3$ and less than 10 ppm of $SO_x$ and $NO_x$.

The invention is applicable to the treatment with ammonia of various gaseous mixtures available at high temperature, whether they be at a pressure in the neighbourhood of atmospheric pressure or at a higher pressure.

We claim:

1. A process for the ammonia treatment of a gas, comprising: stripping ammonia-containing water in a countercurrent manner to the gas to be treated, thereby producing a first gaseous effluent and substantially pure water; countercurrently contacting said first gaseous effluent with an ammonia solution, thereby producing a second gaseous effluent and a liquid effluent; eliminating ammonia from said second gaseous effluent by scrubbing it with said substantially pure water, thereby producing said ammonia-containing water and a final gaseous effluent of the process; heat exchanging said substantially pure water and said ammonia containing water with each other; and using said gas to be treated as the sole source of heating thermal energy for said stripping step.

2. A process according to claim 1, further comprising desorbing by a reduction of pressure said liquid effluent from the countercurrent contact between said first gaseous effluent and said ammonia solution.

3. A process according to claim 2, in which the pressure reduction comprises at least two successive stages, (10, 11), the flash gas issuing from each stage being sent back to the preceding stage.

4. A process according to claim 2, further comprising recycling at least most of the desorbed liquid effluent to said contacting step.

5. A process for the ammonia treatment of a gas, comprising eliminating the ammonia from the gaseous effluent of the treatment by scrubbing with substantially pure water, regenerating the scrubbing water by stripping it in a stripping zone in a countercurrent manner to the gas to be treated, then recycling most of the regenerated scrubbing water by putting it into thermal exchange relation to the scrubbing water to be regenerated, and withdrawing water undergoing stripping from an intermediate region (35A) of said stripping zone.

6. A process for the ammonia treatment of a gas, comprising eliminating the ammonia from the gaseous effluent of the treatment by scrubbing with substantially pure water, regenerating the scrubbing liquid by stripping it in a countercurrent manner to the gas to be treated, then recycling at least most of the regenerated scrubbing liquid by putting it into thermal exchange relation to the scrubbing water to be regenerated, and adjusting the content of ammonia in the scrubbing liquid to be regenerated by addition to said liquid of an additional ammonia solution (38).

7. A process for the ammonia treatment of a gas, comprising eliminating the ammonia from the gaseous effluent of the treatment by scrubbing with substantially pure water, regenerating the scrubbing liquid by stripping it in a countercurrent manner to the gas to be treated, then recycling at least most of the regenerated scrubbing liquid by putting it into thermal exchange relation to the scrubbing water to be regenerated, and subjecting, downstream of said stripping, the gas directly to said scrubbing so that said ammonia treatment is constituted by said regeneration of the scrubbing liquid.

8. A process for the ammonia treatment of a gas, comprising eliminating the ammonia from the gaseous effluent of the treatment by scrubbing with substantially pure water, regenerating the scrubbing liquid by stripping it in a countercurrent manner to the gas to be treated, then recycling most of the regenerated scrubbing liquid by putting it into thermal exchange relation to the scrubbing water to be regenerated, and withdrawing a minor part of said recycled regenerated scrubbing water.

* * * * *